United States Patent [19]

Roth et al.

[11] Patent Number: 4,895,353

[45] Date of Patent: Jan. 23, 1990

[54] FLUID FILLED ELASTOMERIC DAMPING DEVICE

[75] Inventors: Stephen F. Roth, Berlin Heights; L. Dale Coad, Sandusky, both of Ohio

[73] Assignee: The Pullman Company, Princeton, N.J.

[21] Appl. No.: 212,504

[22] Filed: Jun. 28, 1988

[51] Int. Cl.⁴ ............................................. F16F 13/00
[52] U.S. Cl. ................................. 267/140.1; 267/35; 267/141.6
[58] Field of Search ............... 188/298; 180/300, 312; 248/562, 636; 267/219, 259, 35, 293, 152, 140.1, 140.2, 140.5, 141, 141.2, 141.6, 140.3, 140.4

[56] References Cited

U.S. PATENT DOCUMENTS

| | | |
|---|---|---|
| 2,535,080 | 12/1950 | Lee . |
| 2,670,812 | 3/1954 | Cuskie . |
| 2,670,813 | 3/1954 | Lewton et al. . |
| 3,105,574 | 10/1963 | Hoffman . |
| 3,164,381 | 1/1965 | Tuczek . |
| 3,642,268 | 2/1972 | Hipsher . |
| 3,698,703 | 10/1972 | Hipsher . |
| 3,721,417 | 3/1973 | Skala . |
| 3,874,646 | 4/1975 | Vernier . |
| 3,883,101 | 5/1975 | Vernier . |
| 3,888,449 | 6/1975 | Jablonski . |
| 4,005,858 | 2/1977 | Lochner . |
| 4,159,091 | 6/1979 | Le Salver et al. . |
| 4,161,304 | 7/1979 | Brenner et al. . |
| 4,199,128 | 4/1980 | van der Boom et al. . |
| 4,215,842 | 8/1980 | Brenner et al. . |
| 4,262,886 | 4/1981 | Le Salver et al. . |
| 4,277,056 | 7/1981 | Ticks . |
| 4,288,063 | 9/1981 | Brenner et al. . |
| 4,383,679 | 5/1983 | Kakimoto . |
| 4,391,435 | 7/1985 | Pham . |
| 4,420,060 | 12/1983 | Kakimoto . |
| 4,432,537 | 2/1984 | Pletsch . |
| 4,437,653 | 3/1984 | Kakimoto . |
| 4,588,174 | 5/1986 | Konishi . |
| 4,690,389 | 9/1987 | West ............................. 248/562 X |
| 4,728,086 | 3/1988 | Ishiyama et al. . |
| 4,749,173 | 7/1988 | Kanda ............................. 180/312 X |

FOREIGN PATENT DOCUMENTS

| | | |
|---|---|---|
| 838403 | 4/1953 | Fed. Rep. of Germany . |
| 2833776 | 1/1980 | Fed. Rep. of Germany . |
| 3700589 | 7/1987 | Fed. Rep. of Germany ...... 180/300 |
| 642711 | 9/1928 | France . |
| 2168680 | 8/1973 | France . |
| 60-18474 | 9/1985 | Japan . |
| 0206838 | 9/1986 | Japan ................................. 267/219 |
| 0294235 | 12/1986 | Japan ................................. 267/35 |
| 0118131 | 5/1987 | Japan ................................. 267/293 |
| 0118132 | 5/1987 | Japan ................................. 267/293 |
| 0118133 | 5/1987 | Japan ................................. 267/293 |
| 2033534 | 5/1980 | United Kingdom . |
| 2041485 | 9/1980 | United Kingdom . |
| 2192968 | 1/1988 | United Kingdom ................. 267/219 |

Primary Examiner—Andres Kashnikow
Attorney, Agent, or Firm—Russell E. Baumann

[57] ABSTRACT

A vibration bushing damping device includes an inner member and an outer member which is axially paralleled to the inner member and which encloses a substantial section of the inner member. A vibration absorbing resilient body is interposed between the inner and outer members. The body includes a first fluid holding chamber. A second fluid holding chamber is defined between the resilient body and the outer member. The second fluid chamber communicates with the first fluid chamber through a first fluid passageway. A rigid body is movably mounted in the first fluid passageway for controlling fluid flow through the first passageway to a varying extent depending on the position of the rigid body. A second fluid flow path is also provided for the fluid in the first fluid chamber.

15 Claims, 4 Drawing Sheets

FLUID FILLED ELASTOMERIC DAMPING DEVICE

BACKGROUND OF THE INVENTION

The present invention relates generally to damping devices. More specifically, the present invention relates to a fluid filled elastomeric bushing damping device of the type which is used for connecting a vibrating element or assembly, which produces varying types of vibrations, to a rigid support.

The invention will be described particularly in connection with a fluid filled elastomeric damping device of the fluid bushing type, which isolates an internal combustion engine, such as in a vehicle, from the support frame of the engine. However, it should be appreciated that the invention has broader applications and may be used for the absorption of shocks, structural leveling, and energy dissipation in a variety of other environments as well.

In the typical vibration isolating engine mount, a body of natural or synthetic rubber is normally employed. While these elastomeric mounts can be designed to operate in a generally satisfactory manner, such materials inherently have a low coefficient of damping which limits their ability to isolate certain objectionable vibratory inputs to the vehicle, such as those particularly disturbing to a modern lightweight unitized vehicle body and frame construction. An increased damping coefficient is possible by the selection of certain rubber polymers and the use of additives but thus far this technique has proven unsatisfactory because of accompanying adverse effects on other properties of the rubber. Also, an increased damping coefficient produces large damping for all vibratory inputs regardless of frequency or amplitude. This is undesirable in an engine mount particularly when the engine experiences low amplitude, high frequency vibrations.

A major effort is in progress for developing a cost effective means of providing a prescribed and varying amount of damping best suited to damping vibrations of varying frequencies and amplitudes. In this connection, it is well known that for best performance in a hydraulic elastomeric engine mount, damping should be at a maximum at the natural frequency of the mount system It is also desirable that the engine mount be able to handle two distinctly different types of vibrations. More specifically, low frequency vibrations of relatively large amplitude should be damped but in such a way that high frequency vibrations of relatively small amplitude remain relatively undamped but are isolated. Unfortunately, a design for successfully damping high amplitude vibrations, on the order of 0.3 mm or greater, generally will also damp low amplitude vibrations, on the order of 0.1 mm or less. Various schemes have addressed this problem with some success. Many of the schemes are based on the provision of a partition member which is capable of limited free motion between two fluid filled chambers.

One of these devices, for example, is an axial or strut-type damping device which provides two fluid filled chambers in which a partition member permits only limited fluid movement between the chambers. Axial damping devices are, however, complex in design, weigh more, are more expensive to manufacture, and need to be larger in size than bushing-type engine mounts. Engine mounts in the form of bushings are also advantageous over strut-type mounts for safety reasons. In this connection, bushin-type engine mounts better restrain a vehicle engine against movement during a crash than do strut-type mounts. Additionally, bushing-type mounts are advantageous over strut-type mounts since they are better able to damp a rocking motion of the engine. Such a motion is frequently encountered in transaxle mounted engines in front wheel drive vehicles.

Bushing-type damping devices attempting to solve this problem have also been found to be inadequate. More specifically, the conventional bushing desings have found it impossible to successfully handle both high frequency, low amplitude vibrations and low frequency, high amplitude vibrations.

Accordingly, it has been considered desirable to develop a new improved vibration damping device for load carrying and selectively varying damping response to structural agitation which would overcome the foregoing difficulties and others while providing better and more advantageous overall results.

BRIEF SUMMARY OF THE INVENTION

In accordance with the present invention, a new and improved vibration bushing type damping device is provided which is simple in design, economical to manufacture, readily adaptable to a plurality of suspension and mounting member uses with items having a variety of dimensional characteristics and operating vibrations, and which provides a load carrying suspension with improved shock absorption and energy dissipation characteristics.

More particularly in accordance with this aspect of the invention, the bushing type device comprises a rigid inner member and a rigid outer housing which is axially parallel to the inner member and encloses a substantial portion thereof. A vibration absorbing resilient body is interposed between the inner member and the outer housing and comprises a first fluid holding chamber. A second fluid holding chamber is in communication with the first fluid chamber through a first passageway. The second fluid chamber is generally defined between the resilient body and the outer housing. A rigid body which is movably mounted in the first passageway for movement perpendicular to the axis of said device controls fluid flow between the first and second fluid chambers and, at two end positions of movement of the rigid body, blocks substantially all fluid flow between the first and second chambers. A first diaphragm is in fluid communication with second fluid chamber and a means is provided for allowing a second path of fluid flow from the first fluid chamber.

According to another aspect of the invention, a fluid filled elastomeric bushing type vibration damping device is provided which can be used to isolate a vibration generating member, such as an engine, from an associated support member such as a support frame for the engine.

In accordance with another aspect of this invention, the bushing type device comprises a rigid outer housing and a rigid inner member which is substantially enclosed by said outer housing. A vibration absorbing resilient body is interposed between the inner member and the outer housing and comprises a first fluid holding chamber. A second fluid holding chamber is in communication with the first fluid chamber through a first passageway. The second fluid chamber is generally defined between the resilient body and the outer housing. A rigid plate which is movably mounted in the first passageway for movement perpendicular to the axis of said device controls fluid flow to a varying extent between the first and second fluid chambers. A first diaphragm closes off said second fluid chamber and a second fluid path is provided for allowing communication between first and second chambers through a circuitous path.

One advantage of the present invention is the provision of a new and improved bushing type damping device which functions as if it had different stiffnesses depending upon the amplitude and frequency of the vibrations to which it is subjected.

Another advantage of the present invention is the provision of a bushing type vibration damping device having a simple construction that is very reliable in operation and offers good damping characteristics at the natural frequency of the mount system and at low frequency, high amplitude structural agitation while avoiding damping, and consequently a high dynamic spring rate, for high frequency, low amplitude structural agitation.

Still another advantage of the present invention is the provision of a bushing-type damping device in which a partition member is arranged to have limited travel in a passageway separating a pair of fluid holding chambers.

Yet another advantage of the present invention is the provision of a bushing type damping device employing a partition member which is housed in a containerized unit that is replaceable to allow the same base part and different containerized units to be "tuned" for different vibration amplitudes or frequencies.

A still further advantage of the present invention is the provision of a bushing-type fluid damping device having a minimum of parts and in which the ratio of static to dynamic spring rate for small amplitude vibrations can be lowered to approximately 1.0 to 1.6.

A further advantage of the present invention is the provision of a bushing-type fluid damping device employing second and third fluid passageways leading from the first fluid chamber which can be independently "tuned".

A further advantage of the present invention is the provision of a bushing-type damping device which is so designed that it could be easily used in active damping systems.

Still other objects and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

Figure 1:
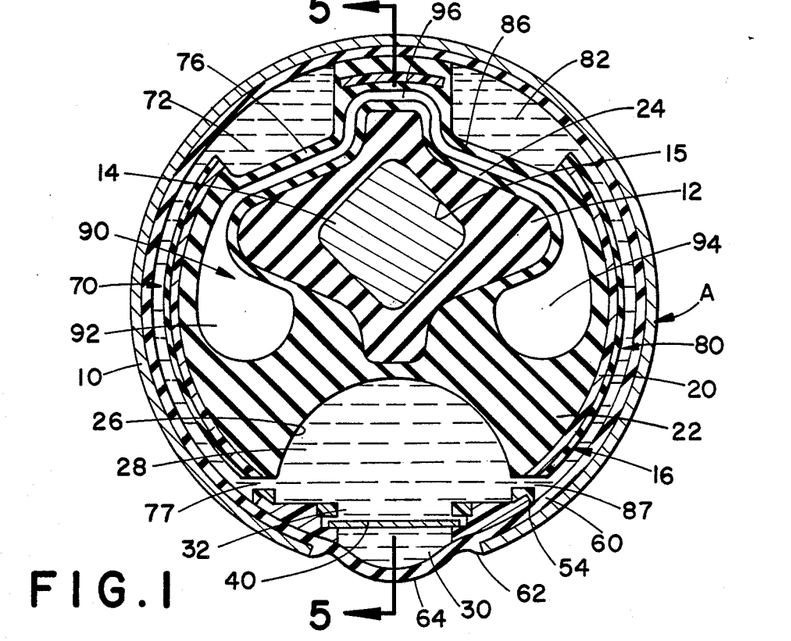
FIG. 1 is a vertical cross-sectional view of a vibration bushing-type device constructed according to a first preferred embodiment of the present invention.

Referring now to the drawings, wherein the drawings are for the purpose of illustrating preferred embodiments of the invention only and not for purposes of limiting same, FIG. 1 shows a first preferred embodiment of the subject new damping device in the way of a bushing-type engine mount A having a generally cirucular cross section. While the damping device is primarily designed for and will hereinafter be described in connection with a bushing which is mounted between an automotive engine and its frame, it will be appreciated that the overall inventive concept involved could be adapted for use in a wide variety of other vibration damping environments as well.

Figures 5, 6, 7:
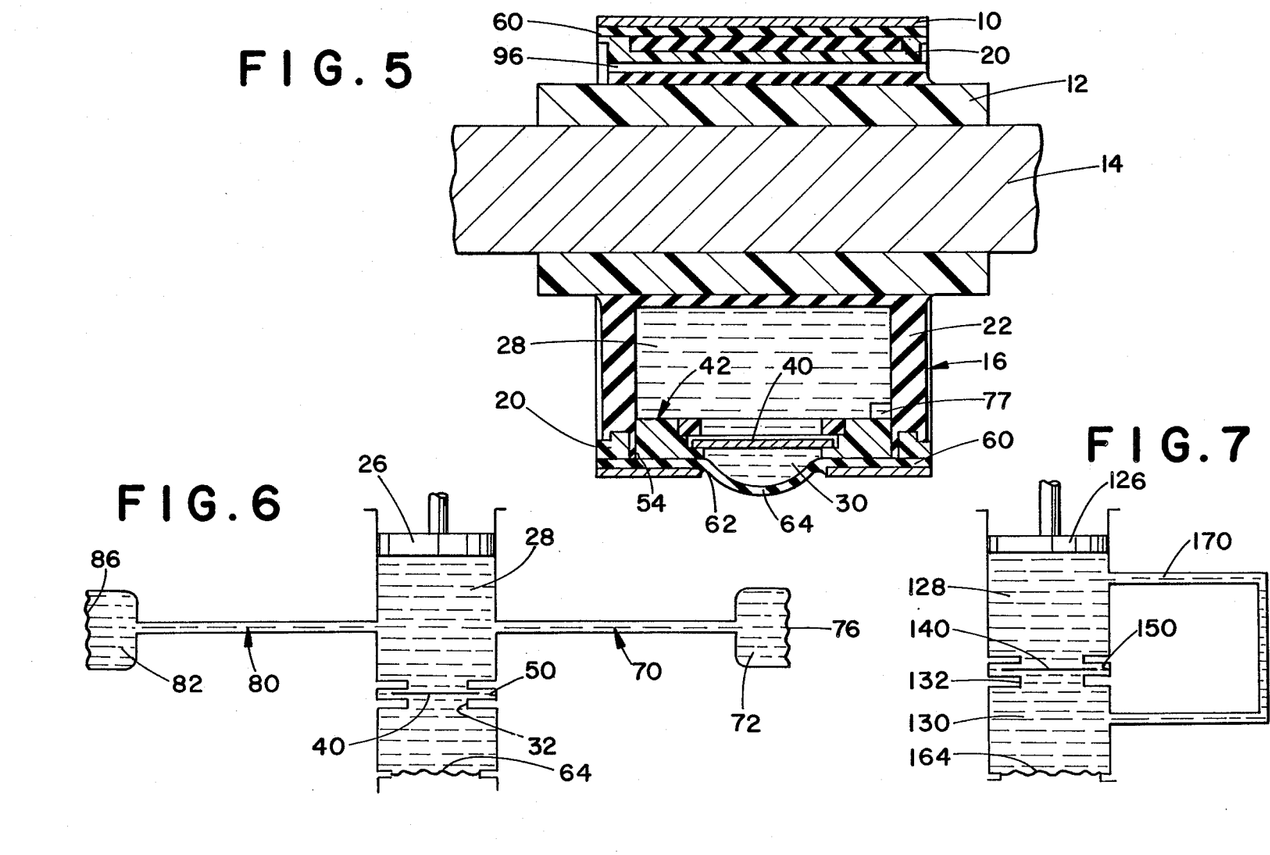
FIG. 5 is a longitudinal cross-sectional view through the damping device of FIG. 1.
FIG. 6 is a schematic view of the damping device of FIG. 1.
FIG. 7 is a schematic view of a bushing damping device according to a second preferred embodiment of the present invention.

With particular reference now to FIGS. 1 and 5, the bushing A is a hydraulic-elastomeric mount which includes a rigid metallic cylindrical outer housing 10 and a rigid plastic inner sleeve 12. These two elements are adapted for use between an engine and a frame holding the engine (not illustrated). In this connection, a support bar 14 which can be connected to either the engine or the frame extends through a suitable configured bore 15 in the inner sleeve 12. The outer housing 10 and the inner sleeve 12 are generally annular in cross-sectional confiuration which is a conventional configuration for engine mount devices of the bushing type and in which the outer member substantially encircles the inner member. It should be noted that the housing 10 and the sleeve 12 could be made of any suitable conventional material as desired.

As is evident from FIGS. 1 and 5, the inner sleeve 12 and the outer housing 10 are axially parallel with each other but the longitudinal axis of the sleeve 12 is preferably spaced away from the longitudinal axis of the housing 10 in the embodiment illustrated to optimize performance characteristics for a set space limitation. It should be recognized however that other configurations of these elements could also be employed as required.

An elastomeric spring 16 is interposed between the inner sleeve 12 and the outer housing 10. The elastomeric spring 16 comprises a rigid spine section 20, which can be made, for example, of a suitable plastic material, which is embedded in an elastomeric body 22. A sleeve engaging wall section 24 of the body 22 is bonded to the inner sleeve 12 as shown in FIG. 1. The bond is achieved with conventional chemical bonding techniques. A section of the elastomeric body 22 forms a piston-like surface 26 which opens on a first fluid holding chamber 28.

A second fluid holding chamber 30, which is generally formed between the spring 16 and the housing 10 is in fluid communication with the first chamber 28 through a first fluid passageway 32. A rigid body or partition plate 40 is movably mounted in the first fluid passage 32 for controlling fluid communication between the first and second chambers.

Figure 2:
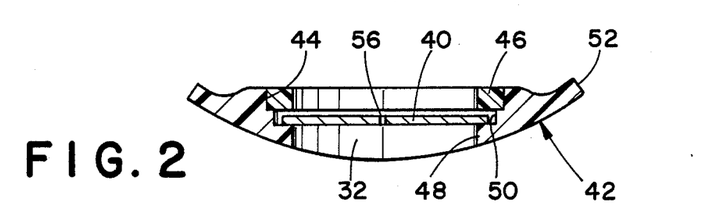
FIG. 2 is an enlarged cross-sectional view through a containerized housing of the damping device of FIG. 1 employing a partition disk.
Figure 3:
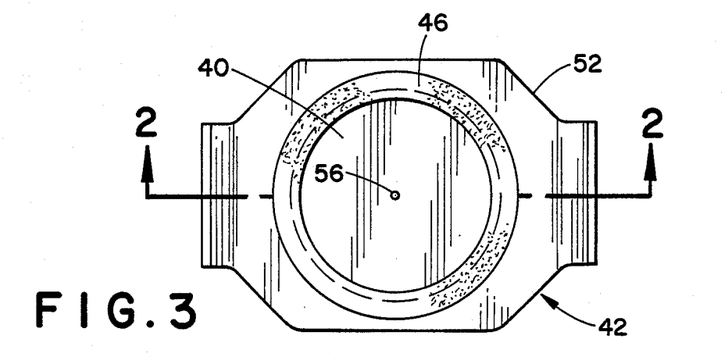
FIG. 3 is a top plan view of the containerized housing of FIG. 2.

With reference now also to FIGS. 2 and 3, the plate 40 can be mounted in a containerized housing 42 such that the first fluid passage 32 is defined by a transverse aperture extending through the housing. A counter bored aperture 44 can be provided on one face of the housing so as to hold an annular ring 46. The annular ring 46 and a flange section 48 of the housing define between them a chamber 50 in the housing, in which chamber the plate 40 can reciprocate. In this embodiment, the up and down motion of the plate 40 in the chamber 50 can be approximately 0.2 to 0.3 mm. It should be appreciated, however, that size of the chamber 50, and the size, configuration, and thickness of the plate 40 can be varied as required for a particular application. This configuration provides control of fluid flow between the chambers.

An exterior periphery 52 of the housing 42 is so dimensioned as to fit in a suitably sized aperture 54 in the spring 16 in a selectively removable manner and be held in place simply by the friction of the elastomeric material of the spring 16 (which is reinforced in this area by the shell 20 as shown in FIG. 5 against the housing 42.

The plate 40 is meant to substantially, but not completely, block fluid flow through the first passage 32 even at the end locations of the plate in the chamber 50. Preferably, a means such as an aperture 56, extends transversely through the plate 40 in order to provide communication between the first and second chambers 28, 30 at all locations of the plate in the chamber 50. A notch or a groove in this plate or housing could equally well be used. The reasons why the aperture 56 is desirable for the equalization of pressures for static loading or the prevention of a hydraulic lock in the second fluid holding chamber 30 is the fact that the aperture apparently helps facilitate the movement of the plate in the housing chamber 50. Accordingly, the aperture 56 is provided in order to prevent a complete blockage of fluid flow into and out of the second chamber 30, even at the end locations of the plate 40 in the chamber 50.

An elastomeric layer 60 is bonded to an inner surface of the outer housing 10. Additionally, the outer housing includes an aperture 62 through which a section of the elastomeric layer 60 extends to form a first diaphragm 64. The first diaphragm 64 forms the outer wall of the second chamber 30 as is evident from FIG. 5.

It is within the scope of the invention to provide the aperture 62 in the outer housing 10 in a wide variety of shapes or configurations. In addition, the elastomeric layer 60 can itself alternately comprise a wide variety of composition such as elastomers including a wire mesh or screen or rigid walls of fabric molded into the coating material.

Figure 4:
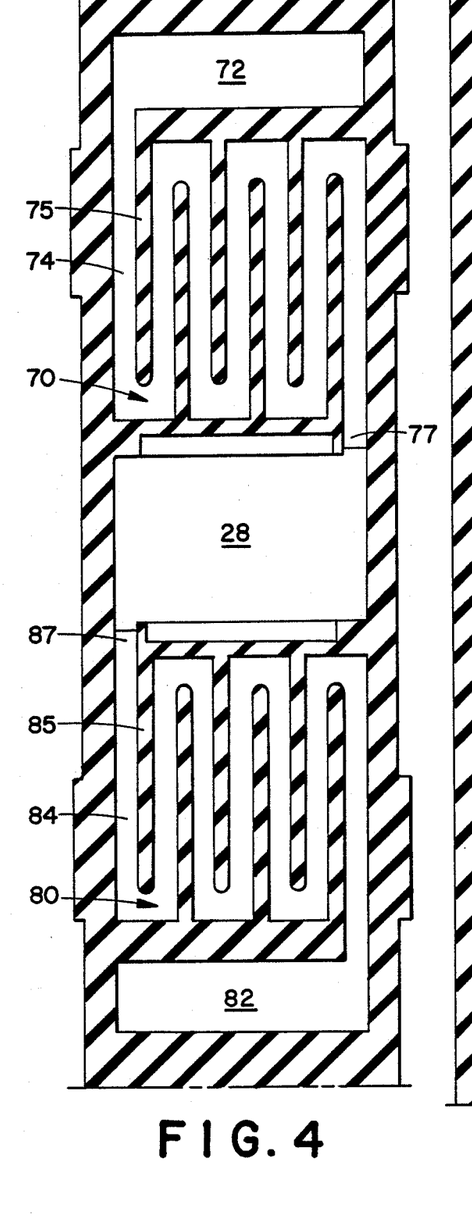
FIG. 4 is a developed view of a fluid channel system of the damping device of FIG. 1.

In communication with the first chamber 28 is a second restricted fluid flow passage 70. With reference now to FIG. 4, the second fluid passage 70 extends from the first chamber 28 to a third chamber 72 defined between the spring 16 and the outer housing 10. The passage 70 is a "tuned resonance" passage defined by a plurality of grooves 74 separated by ribs 75 formed in the elastomeric body 22 of the spring 16. Forming a base of the third chamber 72 is a second diaphragm 76 defined in the body 22 of the spring 16. An outlet port 77 in the spring 16 communicates the first chamber 28 and the second fluid passage 70.

Also in communication with the first chamber 28 is a third restricted flow passage 80 which is spaced away from the second flow passage 70. The third passage is again a tuned resonance package which leads to a fourth chamber 82 defined between the spring 16 and the outer housing 10. The third passage 80 is defined by a plurality of grooves 84 separated by ribs 85 formed in the elastomeric body 22. The fourth chamber 82 is also provided along one surface with a third diaphragm 86 defined in the body 22 of the spring 16. An outlet port 87 in the spring 16 communicates the first chamber 28 with the third fluid passage 80.

With reference again to FIG. 1, the second and third diaphragms 76, 86 are defined in the elastomeric body 22 by the provision of an ambient air chamber 90 in the body. The air chamber has first and second spaced sections 92, 94 which are connected by a channel 96. This construction allows the second and third diaphragms 76, 86 to be defined in the elastomeric body 22 and provides ambient pressure on one surface of the diaphragms. As is evident from FIG. 5, the air chamber 90 is communication with the environment and thus provides a mount with variable fluid chamber volumes.

To effect hydraulic decoupling, the plate 40 can move in passageway 32 between the first and second chambers 28, 30. In other words, the elimination of hydraulic damping, below a prescribed low amplitude at high frequencies, is provided by the plate 40.

However, when large amplitude vibrations move the plate 40 to the extent that fluid flow through the first passage 32 is substantially blocked, fluid can still flow out of the first cavity 28 through the second and third restricted flow passages 70 and 80 and may be best evident from the schematic view of FIG. 6. Such fluid flow is occasioned by the action of the piston 26 on the first fluid chamber 28 as the spring 16 is moved due to the movements imparted to the inner sleeve 12 by the rod 14 or imparted to the outer housing 10 by the portion of the vehicle it is connected to.

More specifically, the vibration bushing damping device with hydraulic decoupler operates in the following manner. When the engine generates small amplitude, high frequency vibrations (such as vibrations of 30 hertz or more at amplitudes of 0.1 mm or less) the displacement of the plate 40 in a direction normal to the housing 42 compensates for the deformation of the elastomeric spring 16 and the variation in the volume of the first and second chambers 28, 30 so that there is substantially no transfer of liquid from one chamber to the other. Under these conditions, the stiffness of the spring 16 is very low and an excellent isolation of the variations is achieved. Such small amplitude, high frequency vibrations can be the result of the firing of the pistons in e.g. 4, 6, and 8 cylinder engines (generally at 30–45 Hz) which are termed first order vibration frequencies, and the vibrations produced by the revolution of the camshaft and the crankshaft (generally at 100–110 Hz).

When in contrast, the engine mass in relation to the vehicle body produces low frequency, high amplitude vibrations (on the order of 10 Hz or less and exceeding about 0.3 mm) the spring 16 is deformed to such an extent that it can no longer be compensated for by the range of movement available to the plate 40 in the first fluid passage 32. As soon as the plate contacts either the annular ring 46 or the flange section 48 in the housing 42, the elastomeric spring 16 operates to restrict fluid flow in the first fluid passage 32 thereby considerably increasing the vertical stiffness of the spring. However, fluid flow does occur between the first chamber 28 and the third and fourth chambers 72 and 82, through the respective restricted "tuned" flow passages 70 and 80. In this case, the prevention of fluid flow through the first fluid passage 32 increases the stiffness of the spring 16 and provides a beneficial damping for the attenuation of the relative movement. Larger amplitude vibrations are encountered because of road conditions which the vehicle experiences as well as other reasons. Generally the types of such vibrations will depend on the interaction of the engine mass with the car body.

A damping of vibrations at approximately 10 hertz has been found to be the optimum or best peak damping frequency for a wide range of vehicle engine mounting applications including both spark ignition and diesel type engines.

It should be recognized that while the second and third restricted flow fluid passages 70, 80 are shown as being identical in construction, different constructions could be utilized in order to "tune" each of the passages for a different vibration. In other words the bushing A disclosed herein can thus be readily adapted or tuned to meet a specific application to give the desired amplitude control as well as the coefficient of damping and resulting dynamic rate best suited to isolate a particular set of vibration conditions. Therefore, a family of mounts can be cost effectively offered with a selectability of such important parameters as dynamic rate as well as amplitude control in a very compact damping device.

Tuning of the bushing A can be effected not only by a change in the geometry of the second and third flow passages, but also by a control of the hardness or durometer of the elastomer from which the spring 16 is made. In this connection, the durometer of the spring 16 can be approximately 50. On the other hand the durometer of the elastomeric layer 60 which forms the diaphragm 64 typically is somewhat less, e.g. approximately 40. Of course any other suitable elastomer durometer can also be utilized for the spring 16 and the diaphragm 64.

Additionally, tuning can be achieved by a control of the shape of the piston-like surface 26 of the spring 16. Other ways of tuning the system could include providing an orifice in the channels 70, 80 or changing the viscosity of the fluid which is contained in the channels. In this connection, conventionally an ethylene glycol and water mixture is provided as the work fluid of the system. However, it should be recognized that any other suitable antifreeze-type fluid such as a propylene glycol and water mixture could also be utilized.

It should also be recognized that yet another way of tuning the system is by precharging the fluid reservoir or by taking fluid out of the reservoir.

Figure 8:
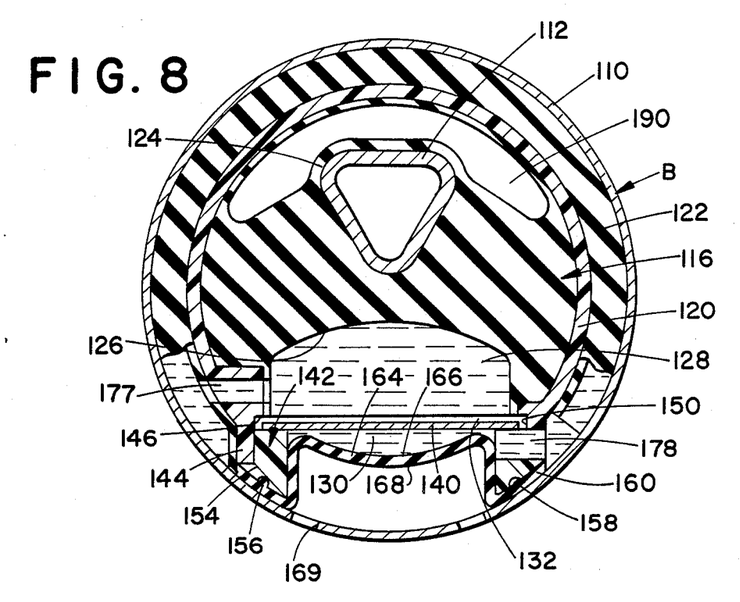
FIG. 8 is a vertical cross-sectional view through the damping device of the second preferred embodiment.

With reference now to FIGS. 7 and 8, a second preferred embodiment of the present invention is there illustrated in the way of a bushing-type hydraulic elastomeric damping device B. This bushinng device includes a rigid cylindrical outer housing 110 which can be made of metal and a rigid inner sleeve 112 that can also be made of metal. These two elements are adapted for association with an engine and an engine frame (not illustrated). An elastomeric spring 116 is interposed between the inner sleeve 112 and the outer housing 110. The spring 116 comprises a rigid shell section 120 to which is bonded an elastomeric body 122. A sleeve engaging wall section 124 of the body 12 is bonded to an outer surface of the inner sleeve 112 by any convention bonding technique.

A section of the elastomeric body 122 forms a piston-like surface 126 which opens onto a first fluid holding chamber 128. A second fluid holding chamber 130 is defined between the spring 116 and the outer housing 110 and is in fluid communication with the first chamber 128 through a first fluid passageway 132. A rigid body or plate 140, which can be made of a suitable metal if desired, is movably mounted in the first fluid passage 132 for controlling fluid communication between the first and second chambers.

Figure 9:
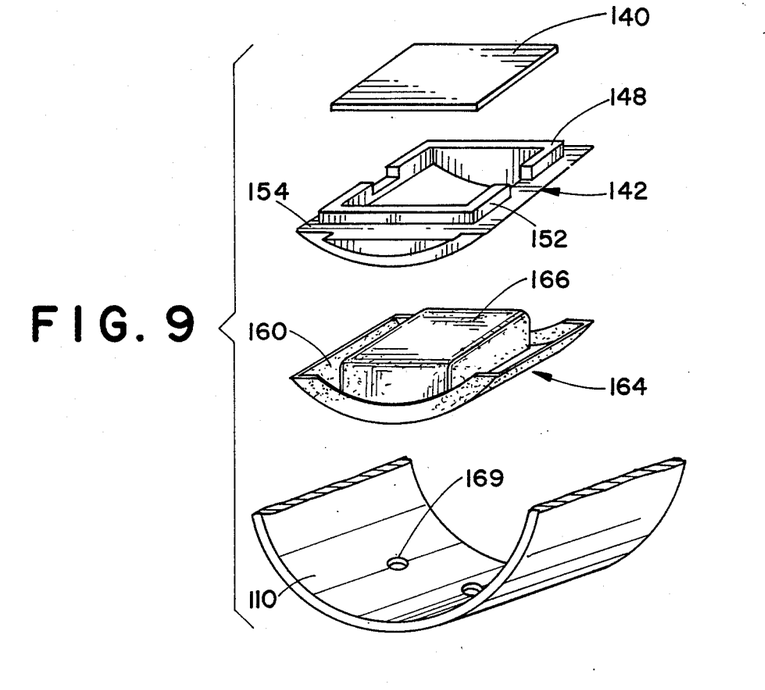
FIG. 9 is an exploded perspective view of several elements of the damping device of FIG. 8; and, FIG. 10 is a developed view of a fluid channel system of the damping device of FIG. 8.

With reference now also to FIG. 9, the plate 140 can be mounted by a rigid frame-like retainer 142 in a flanged section 144 of the spring 116. The plate is secured between a base wall 146 of the spring 116, the base wall being substantially formed by the rigid sheel section 120 thereof, and a confronting wall surface 148 of the retainer. The plate 140 thus reciprocates in a chamber 150 formed between the spring 116 and the retainer 142.

A main portion 152 of the retainer, which can be made of a suitable plastic if desired, fits in the flanged section 144 of the spring 116 with a cap section 154 of the retainer fitting over the top of the spring flange 144. The diaphragm, which is made of a suitable elastomer, also has an indented main section with an inner surface 166, that faces the second chamber 130, and an outer surface 168, that faces the outer housing 110. In the portion of the outer housing adjacent the diaphragm 164 is provided at least one aperture 169. The aperture allows ambient air to communicate with the outer surface 168 of the diaphragm to provide ambient pressure on that surface.

As with the first embodiment, the plate 140 is meant to control fluid flow through the first passage 132. However, in this embodiment the plate completely blocks fluid flow at the end locations of the plate in the chamber 150. In this embodiment, the up and down motion of the plate 140 in the chamber 150 can be approximately 0.2 mm. In comparison with the plate 42 illustrated in FIGS. 1-6, the plate 142 is substantially larger and is allowed to travel a lesser amount.

Figure 10:
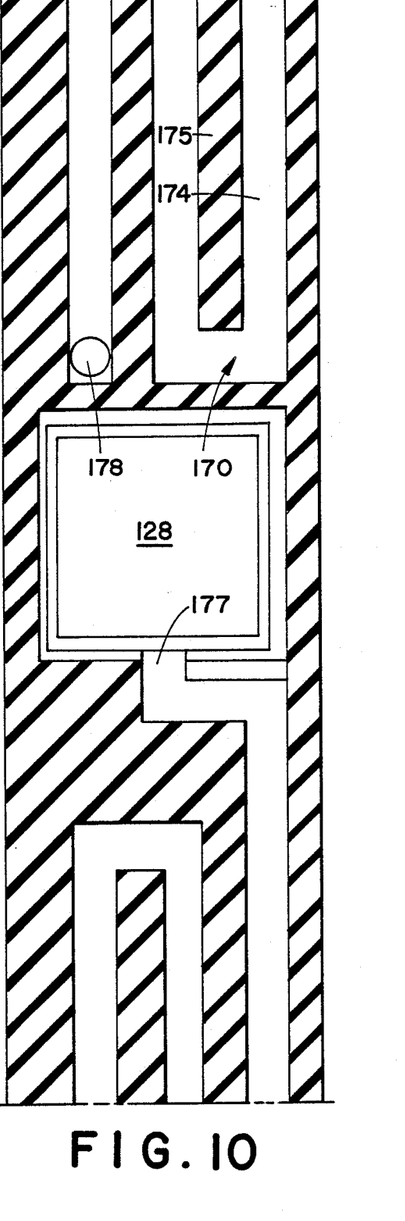

When fluid flow through the first passage 132 is blocked by the plate 140, fluid can still flow out of the first chamber 128 through a second flow passage 170 as is best illustrated in the developed view of FIG. 10. The second fluid passage 170 extends from the first chamber 128 to the second chamber 130 and is defined between the spring 116 and the outer housing 110. The passage 170 is defined by a plurality of grooves 174 separated by ribs 175. An outlet port 177 communicates the first chamber and the fluid passage 170 and a second outlet port 178 communicates the second fluid chamber 130 with the flow passage 170.

An aperture 190 extends longitudinally through the spring 116 to communicate it with the environment as shown in FIG. 8.

As with the first embodiment, when the engine generates small amplitude high frequency vibrations, then the displacement of the plate 140 in a direction normal to the chamber 150 in which it sits compensate for the deformation of the elastomeric spring 116 and the variation in the volume of the first and second chambers 128, 130 so that there is substantially no transfer of liquid from one chamber to the other.

When, in contrast, the bushing experience low frequency high amplitude vibrations, such as may be due to the unevenness of the road surface over which the vehicle is riding, the spring 116 is deformed to such an extent that it can be longer be compensated for by the range of movement available to the plate 140. As soon as the plate contacts either the retainer wall 148 or the abutting base wall 146 of the spring 116, the elastomeric spring greatly stiffens and the first fluid passage 132 is sealed off. Fluid flow in this circumstance occurs between the first chamber 128 and the second chamber 130 through the restricted "tuned" flow passage 170. However, this path of flow takes considerably more time then would flow through the first passage 132. In this case, the prevention of fluid flow through the first flow passage 132 provides a beneficial damping for the attenuation of relative movement between the engine and the frame.

It is noted that the flow channel 174 is considerably wider in the second embodiment than is the flow channel 74 in the first embodiment. On the other hand, the length of the flow channel 74 in the first embodiment is considerably longer than is the channel 174 in the second embodiment. These two geometries are designed to provide substantially the same ratio of A/L to provide a tuned channel resonance in the flow channels.

The second embodiment is considered advantageous in that it has less components than the first embodiment and thus is easier and less expensive to manufacture. The device of the second embodiment also has a lower ratio of static to dyamic spring rate for small amplitude vibrations than does the first embodiment. In this connection, the first embodiment has a ratio of approximately 1 to 3.3 whereas the second embodiment has a ratio of approximately 1 to 1.6.

The second embodiment is also advantageous in that the ports 169 provided in the outer housing 110 can be employed in an active damping system in which a pressurized gas could be admitted into the housing 110 through the ports 169 to act on the free surface 168 of the diaphragm thereby changing the stiffness of the damping device. If desired, pressurized gas could also be admitted into the aperture 190 if closed off to change the stiffness of the spring 116.

The present invention thus provides a compact and cost efficient way of providing a damping device which enables the damping of low frequency, high amplitude vibrations as well as isolation of high frequency, low amplitude vibrations.

The invention has been described with reference to preferred embodiments. Obviously, alterations and modifications will occur to others upon a reading and understanding of this specification. It is intended to include all such modifications and alterations insofar as they come within the scope of the appended claims or the equivalents thereof.

What is claimed is:

1. A fluid filled elastomeric vibration damping device of the circular bushing type which can be used to isolate a vibration generating member, such as an engine, from an associated support member, such as a support frame for the engine comprising:
   a rigid inner member;
   a rigid outer housing which is axially parallel to said inner member and substantially encircles the inner member;
   a vibration absorbing resilient body interposed between said inner member and said outer housing, comprising a first fluid holding chamber;
   a second fluid holding chamber which is in communication with said first fluid chamber through a first path of fluid flow said second fluid chamber being generally defined between said resilient body and said outer housing;
   a rigid body which is movably mounted in said first path of fluid flow for movement perpendicular to the axis of said device for controlling fluid flow between said first and second fluid chambers, at two end positions of movement of said rigid body, blocking substantially all fluid flow between said first and second fluid chambers;
   a means for providing a second path of fluid flow from said first fluid chamber; said means not in direct fluid communication with said second chamber; and,
   a first diaphragm which is in fluid communication with said second fluid chamber.

2. The device of claim 1 wherein said outer housing is made of a rigid tubular material which has an elastomeric layer on an inner surface thereof and wherein said first diaphragm is defined by a section of said elastomeric layer overlying an aperture in said outer member.

3. The device of claim 1 further comprising a housing in which said rigid body is movably mounted and wherein said rigid body comprises a plate.

4. The device of claim 3 wherein said plate has a means which allows a limited amount of fluid communication between said first and second fluid chambers at all positions of said plate.

5. The device of claim 4 wherein said resilient body has a rigid spine section and wherein said housing is secured by a friction fit in a suitably shaped aperture in said resilient body.

6. The device of claim 1 wherein said means for providing a second path comprises;
   a second diaphragm defined in said resilient body; and
   a second fluid passageway leading from said first fluid chamber to said second diaphragm.

7. The device of claim 6 wherein said means for providing a second path further comprises:
   a third diaphragm defined in said resilent body; and
   an additional fluid passageway leading from said first fluid chamber to said third diaphragm.

8. The device of claim 6 wherein a portion of said resilient body encases said inner member and wherein said resilient body further comprises an air chamber defined between said second diaphragm and a portion of said resilient body encasing said inner member.

9. The device of claim 1 wherein a longitudinal axis of said inner member is spaced away from a longitudinal axis of said outer member.

10. The device of claim 1 wherein said first diaphragm in fluid communication with said second fluid chamber is held within said outer housing and wherein said outer housing comprises at least one aperture which allows ambient air to communicate with a face of said first diaphragm.

11. The damping device of claim 1 wherein said absorbing resilient body is an elastomeric spring, said spring comprising:
   a means defining a piston that is secured to said inner member;
   a second diaphragm wherein said means for providing a second path of fluid flow includes a second fluid path for communicating said first fluid chamber with said second diaphragm.

12. The damping of claim 11 in which said spring further comprises a third diaphragm wherein said means for providing a second path of fluid flow includes an additional fluid path for communicating said first fluid chamber with said third diaphragm.

13. A vibration damping device of the bushing type being circular in shape comprising:
   a rigid outer housing;
   a rigid inner member substantially encircled by said outer housing;
   a vibration abosrbing resilient body interposed between said inner member and said outer housing, a first fluid chamber being defined in said resilient body;
   a second fluid chamber defined between said resilient body and said outer housing, said second chamber being in fluid communication with said first chamber through a first fluid passageway;
   a plate movably mounted in said first passageway for movement perpendicular to the axis of the said device for controlling a flow of fluid through said first passageway to a varying extent depending upon the position of said plate in said first passageway;
   a first diaphragm forming part of the boundary of the said second fluid chamber, and,
   a second fluid passageway which communicates said first and second chambers through a circuitous path in the vibration absorbing resilient body for compactness of design.

14. The device of claim 13 further comprising a retainer, wherein said plate is mounted between a shoulder defined in said resilient body and said retainer and wherein said diaphragm is secured between said retainer and said outer housing.

15. The device of claim 13 wherein said outer housing is provided with at least one aperture adjacent said diaphragm to communicate a side of said diaphragm with a source of pressurized gas.

* * * * *